United States Patent
Watanabe

(10) Patent No.: US 10,469,709 B2
(45) Date of Patent: Nov. 5, 2019

(54) DEVICES, SYSTEMS, AND METHODS FOR CONTROLLING A LINK WITH A STORAGE SERVER

(71) Applicant: Taichi Watanabe, Kanagawa (JP)

(72) Inventor: Taichi Watanabe, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/809,285

(22) Filed: Nov. 10, 2017

(65) Prior Publication Data
US 2018/0139355 A1 May 17, 2018

(30) Foreign Application Priority Data

Nov. 15, 2016 (JP) ................................ 2016-222668

(51) Int. Cl.
| H04N 1/44 | (2006.01) |
| H04N 1/00 | (2006.01) |
| H04N 1/327 | (2006.01) |
| H04N 1/21 | (2006.01) |

(52) U.S. Cl.
CPC ....... *H04N 1/4426* (2013.01); *H04N 1/00344* (2013.01); *H04N 1/2166* (2013.01); *H04N 1/32795* (2013.01); *H04N 2201/0094* (2013.01)

(58) Field of Classification Search
CPC .................................................. H04N 1/2166
See application file for complete search history.

(56) References Cited

U.S. PATENT DOCUMENTS

| 2014/0123239 A1 | 5/2014 | Fukuda et al. |
| 2014/0129607 A1 | 5/2014 | Nagumo |
| 2014/0146363 A1 | 5/2014 | Hirokawa et al. |
| 2016/0072967 A1* | 3/2016 | Yoshimura ......... H04N 1/00973 358/1.15 |

FOREIGN PATENT DOCUMENTS

| JP | 2004-213057 | 7/2004 |
| JP | 2014-095986 | 5/2014 |
| JP | 2014-112354 | 6/2014 |
| JP | 2014-130570 | 7/2014 |

* cited by examiner

*Primary Examiner* — Lennin R Rodriguezgonzalez
(74) *Attorney, Agent, or Firm* — Harness, Dickey & Pierce P.L.C.

(57) ABSTRACT

A device communicably connected to one or more storage servers via a network includes circuitry. The circuitry acquires storage setting information including a setting relating to at least one storage server to be used by a user who is identified through a user authentication process. The circuitry acquires application operation information including a setting relating to operation of an application that operates on the device, the application operation information being associated with identification information of the user. The circuitry communicates with one storage server that is set by the application operation information, based on the setting relating to the at least one storage server included in the storage setting information.

20 Claims, 16 Drawing Sheets

FIG. 7

```
{
  "userId":"user0001",
  "familyName":"test",
  "givenName":"user",
  "mailAddresses":["user0001@.example.com"],
  "locale":"ja_JP",
  "timezome":"Asia/Tokyo",
  "authentication":[{
      "authId":"aaaaaaaaaaaaaaaa",
      "spId":"google",
    },
    {
      "authId":"bbbbbbbbbbbbbbbb",
      "spId":"office365"
    }
  ]
}
```

FIG. 8

```
{
   "storage":{
      "service":"office365"
   },
   "common":{
      ":rootFolderId":"",
      "uploadErrorMailAddress":null,
      "scanColor":"auto_color",
      "scanResolution":"300",
      "fileFormat":"pdf",
      "mailSubject":"Subject",
      "mailBody":"",
      "documentFormat":"pdf",
   },
}
```

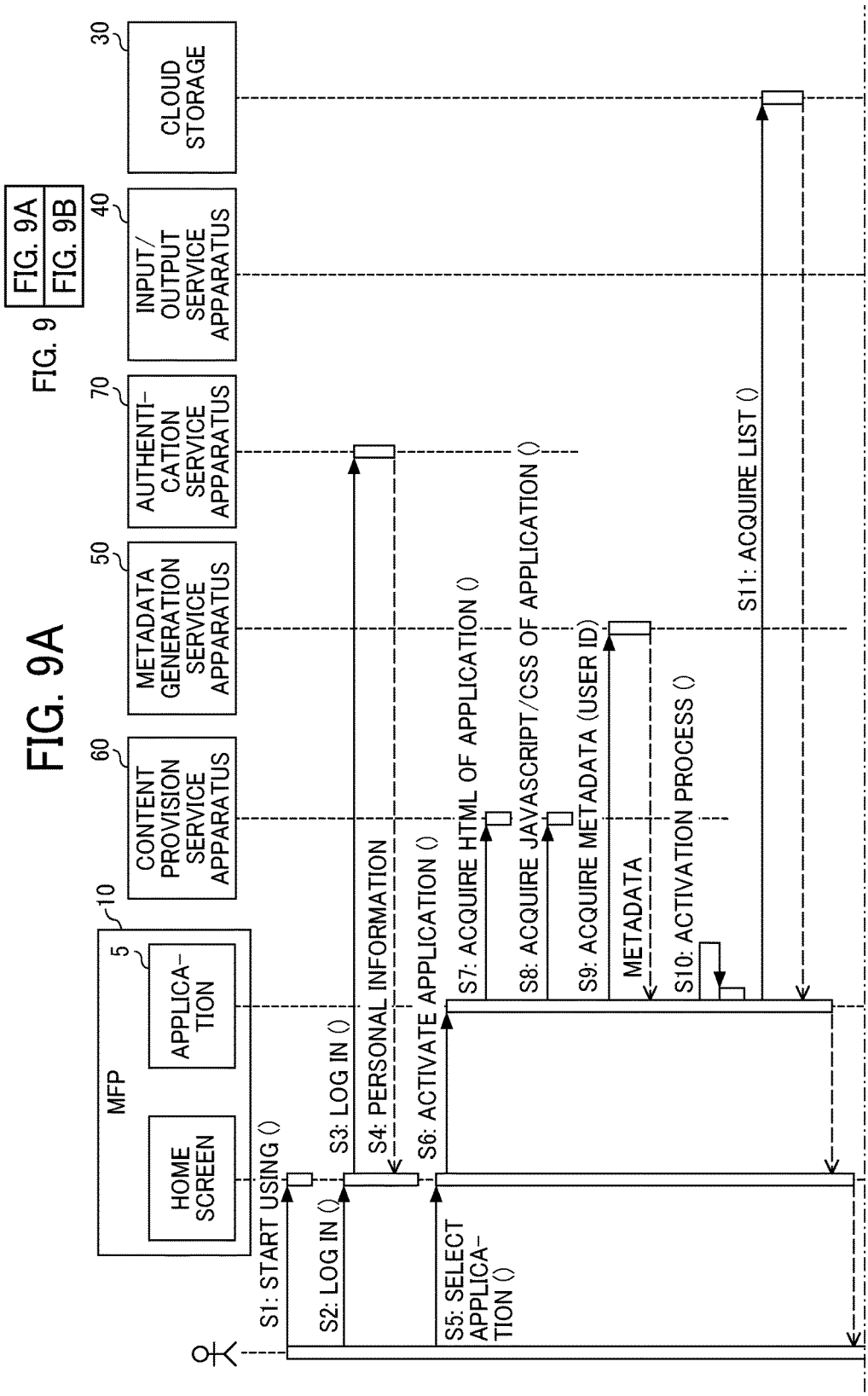

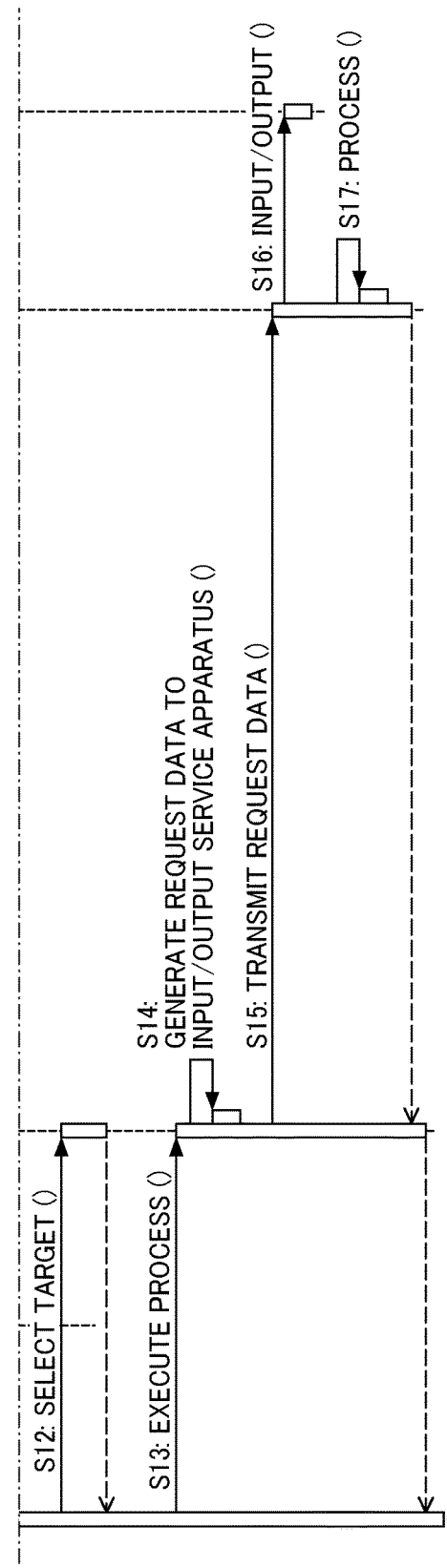

DEVICES, SYSTEMS, AND METHODS FOR CONTROLLING A LINK WITH A STORAGE SERVER

CROSS-REFERENCE TO RELATED APPLICATION

This patent application is based on and claims priority pursuant to 35 U.S.C. § 119(a) to Japanese Patent Application No. 2016-222668, filed on Nov. 15, 2016, the entire disclosure of which is hereby incorporated by reference herein.

BACKGROUND

Technical Field

The present disclosure relates to a device, a device coordination system, and a device coordination method.

Description of the Related Art

A device coordination system is known in which a plurality of devices cooperate with one another to perform data processing. A device coordination service provided by the device coordination system enables a device to which data is input, a device that processes data, and device that outputs data to cooperate with one other, thereby efficiently performing user's desired processing and routine work.

For example, a device coordination service called "Scan To Stage" is known, which delivers image data that is generated by scanning a document or the like using a multifunction peripheral in a user environment, to a preset cloud storage (information storage system on a network). Such device coordination service whose output destination is a storage is called a cloud storage service.

In addition, a device is known that is capable of expanding a range to be set as a transmission destination of image data.

Cloud storage services are provided by many providers or companies, etc. Cloud storage services can be used by both individuals and companies. When used in a company, a cloud storage service is managed using a company administrator's ID.

SUMMARY

A device communicably connected to one or more storage servers via a network includes circuitry. The circuitry acquires storage setting information including a setting relating to at least one storage server to be used by a user who is identified through a user authentication process. The circuitry acquires application operation information including a setting relating to operation of an application that operates on the device, the application operation information being associated with identification information of the user. The circuitry communicates with one storage server that is set by the application operation information, based on the setting relating to the at least one storage server included in the storage setting information.

BRIEF DESCRIPTION OF THE DRAWINGS

A more complete appreciation of the embodiments and many of the attendant advantages and features thereof can be readily obtained and understood from the following detailed description with reference to the accompanying drawings, wherein:

FIG. 7 illustrates an example of personal information, according to an embodiment of the present disclosure;

FIG. 8 illustrates an example of metadata, according to an embodiment of the present disclosure;

FIGS. 9A and 9B are a sequence diagram illustrating an example of a process performed by the device coordination system when a user uses the device coordination system, according to an embodiment of the present disclosure;

DETAILED DESCRIPTION

Figure 1:
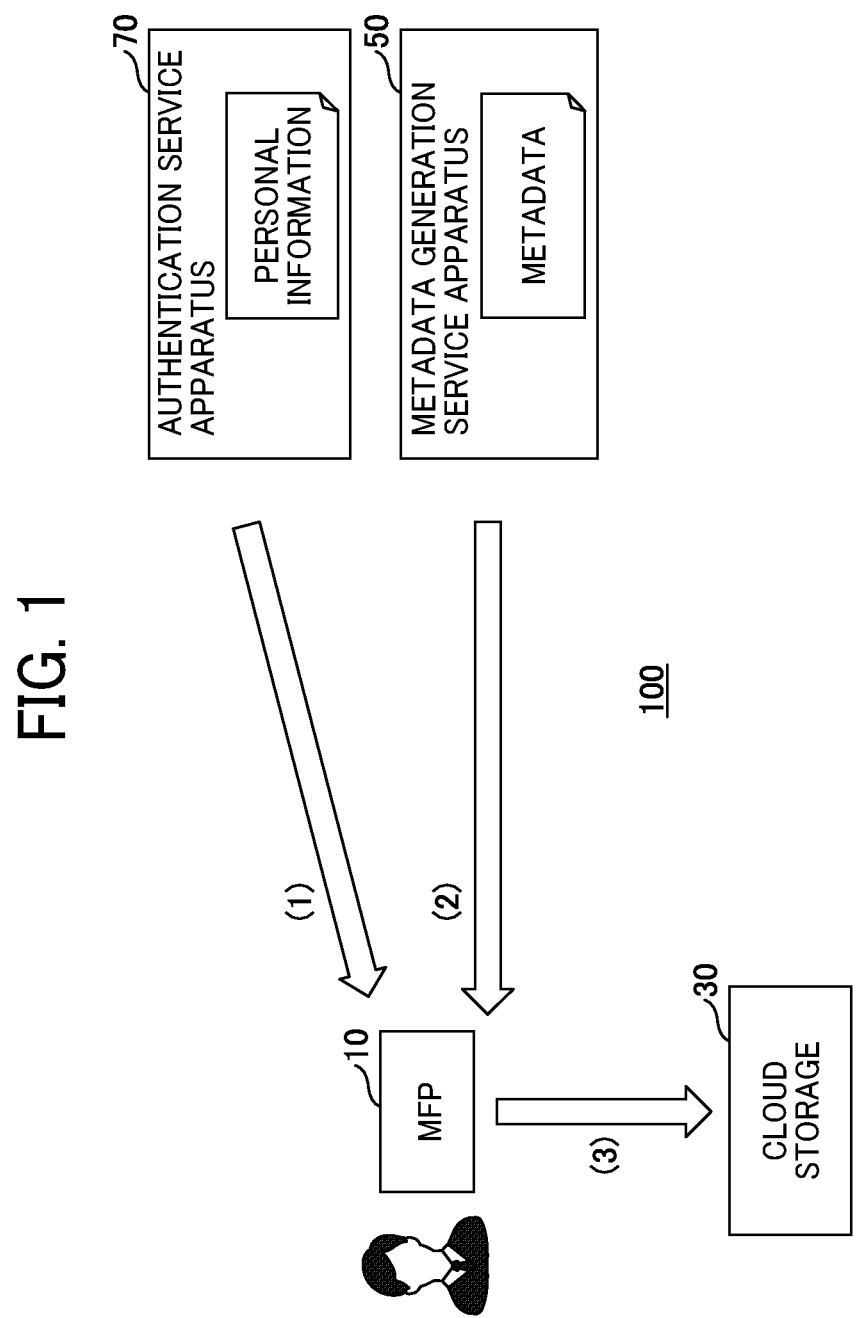
FIG. 1 is a schematic diagram illustrating an operation of a device coordination system, according to an embodiment of the present disclosure.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

As used herein, the singular forms "a", "an", and "the" are intended to include the multiple forms as well, unless the context clearly indicates otherwise.

Hereinafter, a description is given of embodiments of a device coordination system, a device coordination method performed by the device coordination system with reference to the drawings.

<Overview of Operation of Device Coordination System>

FIG. 1 is a schematic diagram illustrating an operation of a device coordination system 100 according to an embodiment of the present disclosure. A multifunction peripheral 10 is communicably connected to a metadata generation service apparatus 50 and an authentication service apparatus 70 via a network.

(1) A user operates the multifunction peripheral 10 to login to acquire personal information (an example of storage setting information) from the authentication service apparatus 70.

(2) The multifunction peripheral 10 acquires metadata (an example of application operation information) from the metadata generation service apparatus 50 using an authenticated user identification (ID).

(3) In the personal information, a cloud storage 30 to be used by the user and authentication information are set. In the metadata, the cloud storage 30 is set that is to be used by the user on an application operating on the multifunction peripheral 10. The multifunction peripheral 10 accesses the cloud storage 30 designated by the metadata using the authentication information of the personal information, to upload or read out a file to and from the cloud storage 30.

Thus, the user is able to use the cloud storage 30 that he/she is using by logging in the device coordination system 100.

<Terms Used in the Disclosure>

An information storage system is one or more storage devices (servers) on a network that store various types of data. In the present embodiment, a term "cloud storage" is used to describe the information storage system.

Storage setting information refers to information relating to one or more storage servers of the cloud storage that a user may possibly use. The storage setting information includes a name (identification information) of the cloud storage and authentication information for login. In the present embodiment, a term "personal information" is used to describe the storage setting information.

The application operation information is settings of an application operating on the multifunction peripheral 10. The application operation information specifies parameters of the application when operating and a cloud storage to be used by this application. However, even when no cloud storage is specified in the application operation information, the multifunction peripheral 10 is able to use the cloud storage 30.

Folder information is information that specifies a folder of the cloud storage. In the present embodiment, this folder is a default folder. Information relating to a folder is information obtained from a folder, such as a folder name or a name of file in the folder.

<Example of System Configuration>

Figure 2:
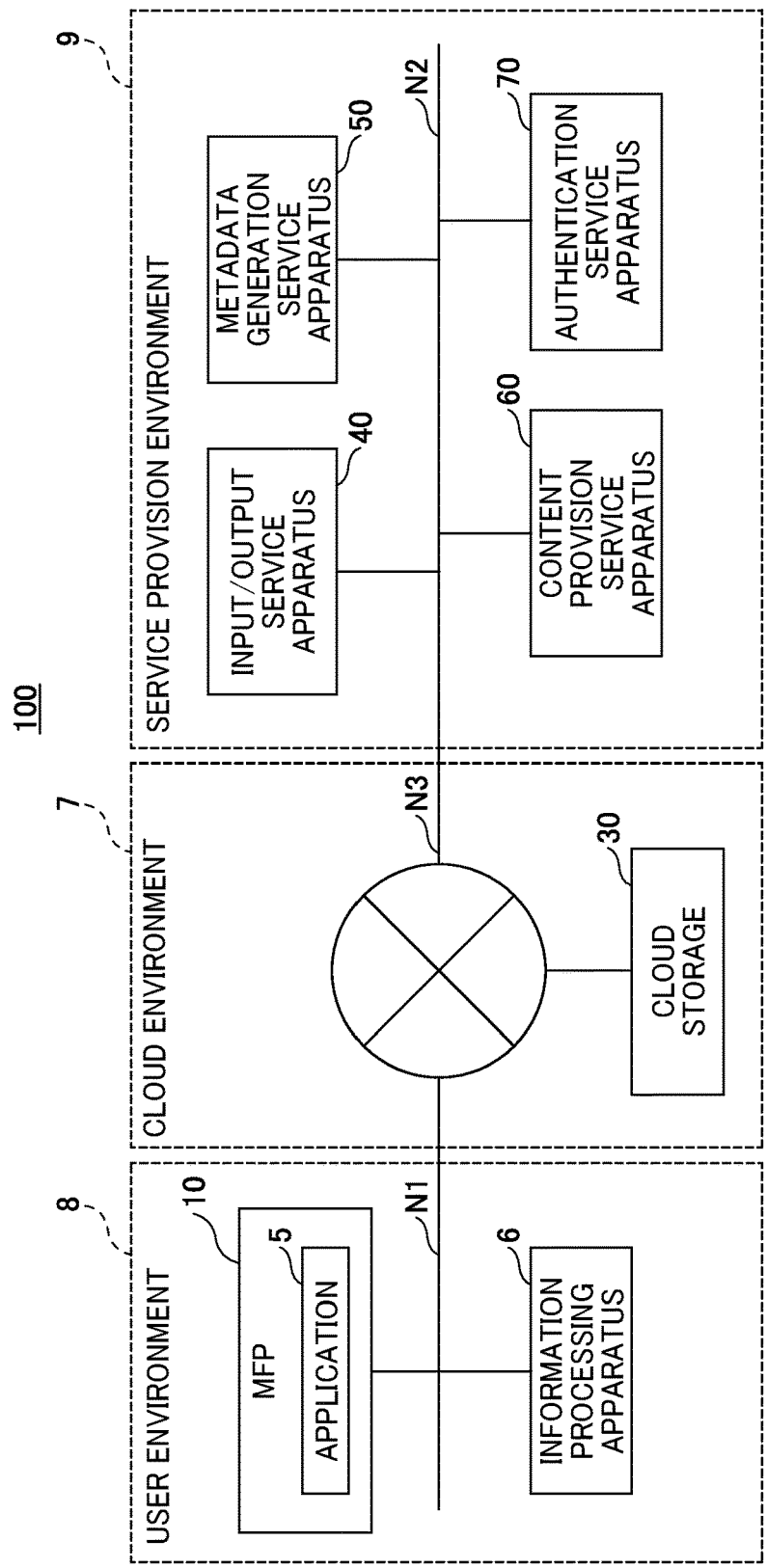
FIG. 2 is a schematic block diagram illustrating an example configuration of the device coordination system, according to an embodiment of the present disclosure.

FIG. 2 is a schematic block diagram illustrating an example configuration of the device coordination system 100 according to the present embodiment. The device coordination system 100 has three environments, that is, a user environment 8, a service provision environment 9, and a cloud environment 7.

The user environment 8 is an environment in which a user conducts work. Examples of the user environment 8 include inside a facility of a company to which the user belongs. In the user environment 8, the multifunction peripheral 10 and an information processing apparatus 6, which are communicable with each other, are provided via a network N1. The network N1 is a local area network (LAN) built in a facility such as a company. A user scans a document using the multifunction peripheral 10.

Both the multifunction peripheral 10 and the information processing apparatus 6 are capable of executing browser software or equivalent software, and communicate with apparatuses in the service provision environment 9 through networks N1, N2 and N3.

The multifunction peripheral 10 has functions of an information processing apparatus, and also provides other useful functions. The multifunction peripheral 10 has at least a scanner function. The multifunction peripheral 10 may further have a printer function and a facsimile function. The multifunction peripheral 10 may be referred to as an MFP, an image forming apparatus, a multifunction printer, a copy machine, office equipment, or the like. In addition, a document may be converted into image data using devices or functions other than the scanner function of the multifunction peripheral 10. For example, in place of the multifunction peripheral 10, a digital camera or various types of devices having functions of a digital camera may be used.

Several applications 5 operates on the multifunction peripheral 10. The application 5 is an application corresponding each function provided by the multifunction peripheral 10. Examples of the application 5 include a scan application or a print application.

The information processing apparatus 6 is implemented by a personal computer (PC), for example. In alternative to a PC, the information processing apparatus 6 may be implemented by a smartphone, a tablet terminal, a mobile phone, a personal digital assistant (PDA), a wearable PC, etc.

The information processing apparatus 6 is used by a user or an administrator of the device coordination system 100. The information processing apparatus 6 accepts an operation by the user or the administrator to set the metadata in the metadata generation service apparatus 50. Further, the information processing apparatus 6 sets the personal information in the authentication service apparatus 70. It should be noted that the multifunction peripheral 10 is also capable of performing the same or substantially the same settings as above that are performed by the information processing apparatus 6.

The service provision environment 9 is an environment where apparatuses that provide device coordination services provided by the device coordination system 100 are provided. The service provision environment 9 may be in the cloud or in any suitable facility. Further, all of the apparatuses of the service provision environment 9 do not have to be included in a single facility. In other words, the apparatuses of the service provision environment 9 may be distributed over multiple facilities or in the cloud. The service provision environment 9 includes an input/output service apparatus 40, the metadata generation service apparatus 50, a content providing service apparatus 60, and the authentication service apparatus 70.

Each of these apparatuses is implemented by one or more information processing apparatuses. As illustrated in FIG. 2, one information processing apparatus may provide one service. Alternatively, one information processing apparatus may provide a plurality of services.

The content providing service apparatus 60 has functions of an information processing apparatus, and provides a user with an application 5, etc. The application 5 is a web application operating in the user environment 8. The web application causes the browser software to draw a user interface with the Hyper Text Markup Language (HTML) and Cascading Style Sheets (CSS). Further, the web application controls the multifunction peripheral 10 or performs screen transition with a script language.

The authentication service apparatus 70 has functions of an information processing apparatus. More specifically, the authentication service apparatus 70 implements an authentication function that enables the multifunction peripheral 10 to cooperate with an external service (the cloud storage 30 in the present embodiment), and manages user information. The authentication service apparatus has functions as an authentication apparatus that performs an authentication process for authenticating a user and identifying the authenticated user. In the present embodiment, the user information includes the personal information. This personal information includes settings relating to a storage link. One or more cloud storages 30 possibly used by a user are registered in the personal information. In response to establishment of the authentication, the multifunction peripheral 10 is able to obtain the personal information. A description is given later of the personal information with reference to FIG. 7.

The metadata generation service apparatus 50 has functions of an information processing apparatus. More specifically, the metadata generation service apparatus 50 manages and stored the metadata for each user. Further, the metadata generation service apparatus 50 stores a list or uniform resource locators (URLs) of the cloud storages 30 that the user can use, that is, the cloud storages 30 that are permitted to be used in the device coordination system 100. The metadata generation service apparatus 50 provides the multifunction peripheral 10 or an information processing apparatus operated by a user with the list or URLs, in response to a request from the multifunction peripheral 10 or the information processing apparatus. The metadata can be defined in advance by a developer or user of the application 5. A description is given later of the metadata with reference to FIG. 8.

The input/output service apparatus 40 has functions of an information processing apparatus. In the device coordination service, the input/output service apparatus 40 provides a function of absorbing a difference between unique functions (such as a function of adding bibliographic information) of a plurality of cloud storages 30. In addition, the input/output service apparatus 40 provides an optical character reader (OCR) function, a file conversion function, etc. From the viewpoint of the multifunction peripheral 10, the input/output service apparatus 40 is an interface between the multifunction peripheral 10 and an external service such as the cloud storage 30. The multifunction peripheral 10 cooperates with the input/output service apparatus 40 to provide a service to the user. Since the input/output service apparatus 40, instead of the multifunction peripheral 10, has these functions, the development of the application 5 is facilitated and the cost of the device coordination system 100 can be reduced.

The cloud environment 7 is an environment that provides resources on the Internet. For example, in a case in which the LAN of the facility is inside a firewall, the cloud environment 7 is outside the firewall. More specifically, the cloud environment 7 is built in a data center, for example. However, this is just an example, and the cloud environment 7 may be built in any suitable location. In addition, the Internet is a network that connects computers on a worldwide scale, and is a network configured by interconnecting networks all over the world.

The cloud storage 30 is a storage on the Internet. The cloud storage 30 can be also interpreted as a storage used in a service that provides a user with a disk space on the Internet. The cloud storage 30 may also referred to as an online storage. Both general users and companies can use the cloud storage 30. By using the cloud storage 30, a company does not have to build a file server environment at their own. This enables the company to increase or decrease the capacity as necessary. Further, a terminal is able to access the cloud storage 30 via the Internet to store and retrieve document data in or from the cloud storage 30.

The cloud storage 30 has a large storage capacity. In addition, the cloud storage 30 usually has functions of an information processing apparatus as well as a storage function. Cloud computing is a term used when specific hardware resources are not intended. The cloud storage 30 is not necessarily housed in one housing nor provided as apparatus of one unit. The cloud storage 30 is configured as hardware resources that dynamically connect/disconnect according to load. Further, the cloud storage 30 may be built a virtual environment within one information processing apparatus. In another example, the cloud storage 30 may be built across a plurality of information processing apparatuses.

In the present embodiment, the cloud storage 30 may be provided in the user environment 8 or the service provision environment 9. In this case, the cloud storage 30 is simply called storage. It is preferable that each apparatus in the service provision environment 9 also supports cloud computing.

<Example of Hardware Configuration>

Figure 3:
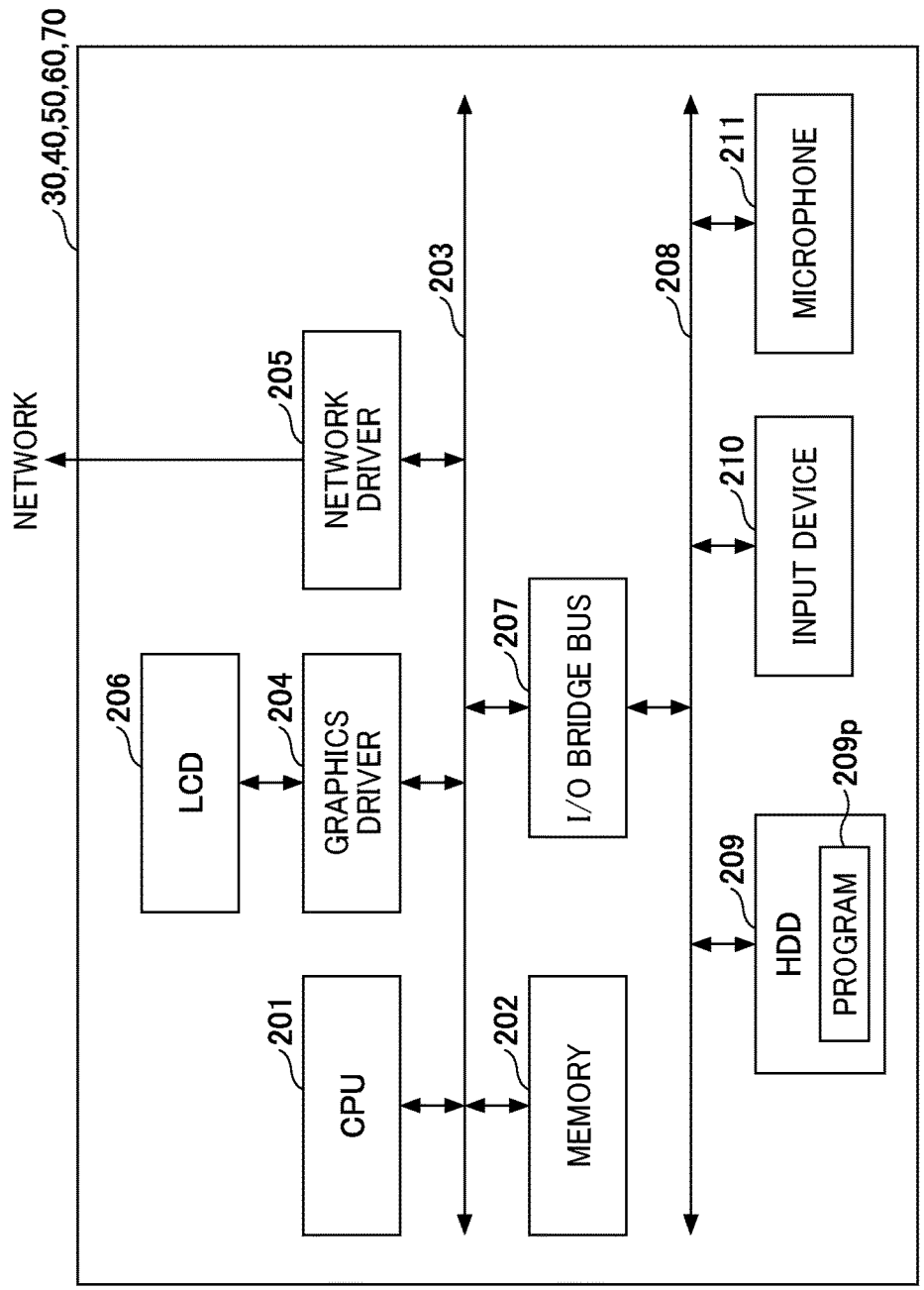
FIG. 3 is a schematic block diagram illustrating an example hardware configuration of an apparatus in a service provision environment, according to an embodiment of the present disclosure.

FIG. 3 is a schematic block diagram illustrating an example hardware configuration of an apparatus in the service provision environment 9. In FIG. 3, a description is given of the metadata generation service apparatus 50 as an example of the apparatus. The metadata generation service apparatus 50 includes a central processing unit (CPU) 201 and a memory 202 that enables high-speed access to data used by the CPU 201. The CPU 201 and the memory 202 are connected to other devices or drivers of the metadata generation service apparatus 50, such as a graphics driver 204 and a network driver (NIC) 205, via a system bus 203.

The graphics driver 204 is connected to a liquid crystal display (LCD) 206 as an example of display device via a bus. The graphics driver 204 monitors a processing result by the CPU 201. Further, the network driver 205 connects the metadata generation service apparatus 50 to the network N2 at a transport layer level and a physical layer level to establish a session with the multifunction peripheral 10, for example.

An input/output (I/O) bus bridge 207 is further connected to the system bus 203. On the downstream side of the I/O bus bridge 207, a storage device such as a hard disc drive (HDD) 209 is connected via an I/O bus 208 such as a peripheral component interconnect (PCI), in compliance with the Integrated Drive Electronics (IDE), Advanced Technology Attachment (ATA), AT Attachment Packet Interface (ATAPI), serial ATA, Small Computer System Interface (SCSI), Universal Serial Bus (USB), etc. The HDD 209 stores a program 209p for controlling overall operations of the metadata generation service apparatus 50. A solid state drive (SSD) may be used in alternative to the HDD 209. The program 209p may be distributed, as being stored in a storage medium. Alternatively, the program 209p may be distributed from a server for program distribution.

An input device 210 such as a keyboard and a mouse (called a pointing device) is connected to the I/O bus 208 via a bus such as a USB. The input device 210 accepts inputs or instructions by an operator such as an administrator of the device coordination system 100.

It should be noted that the illustrated hardware configuration of the metadata generation service apparatus 50 indicates hardware elements preferably included in the metadata generation service apparatus 50. In addition, in order to support the cloud computing, a physical configuration of the metadata generation service apparatus 50 of the present embodiment does not have to be static. In other words, hardware resources may be dynamically connected/disconnected to constitute the metadata generation service apparatus 50.

The hardware configurations of the input/output service apparatus 40, the content providing service apparatus 60, the authentication service apparatus 70, the information processing apparatus 6, and the cloud storage 30 are the same or substantially the same as those of the metadata generation service apparatus 50. Any of those apparatuses may have the different hardware configuration as long as the difference causes no problem in describing the device coordination system 100 of the present embodiment.

<<Hardware Configuration of Multifunction Peripheral 10>>

Figure 4:
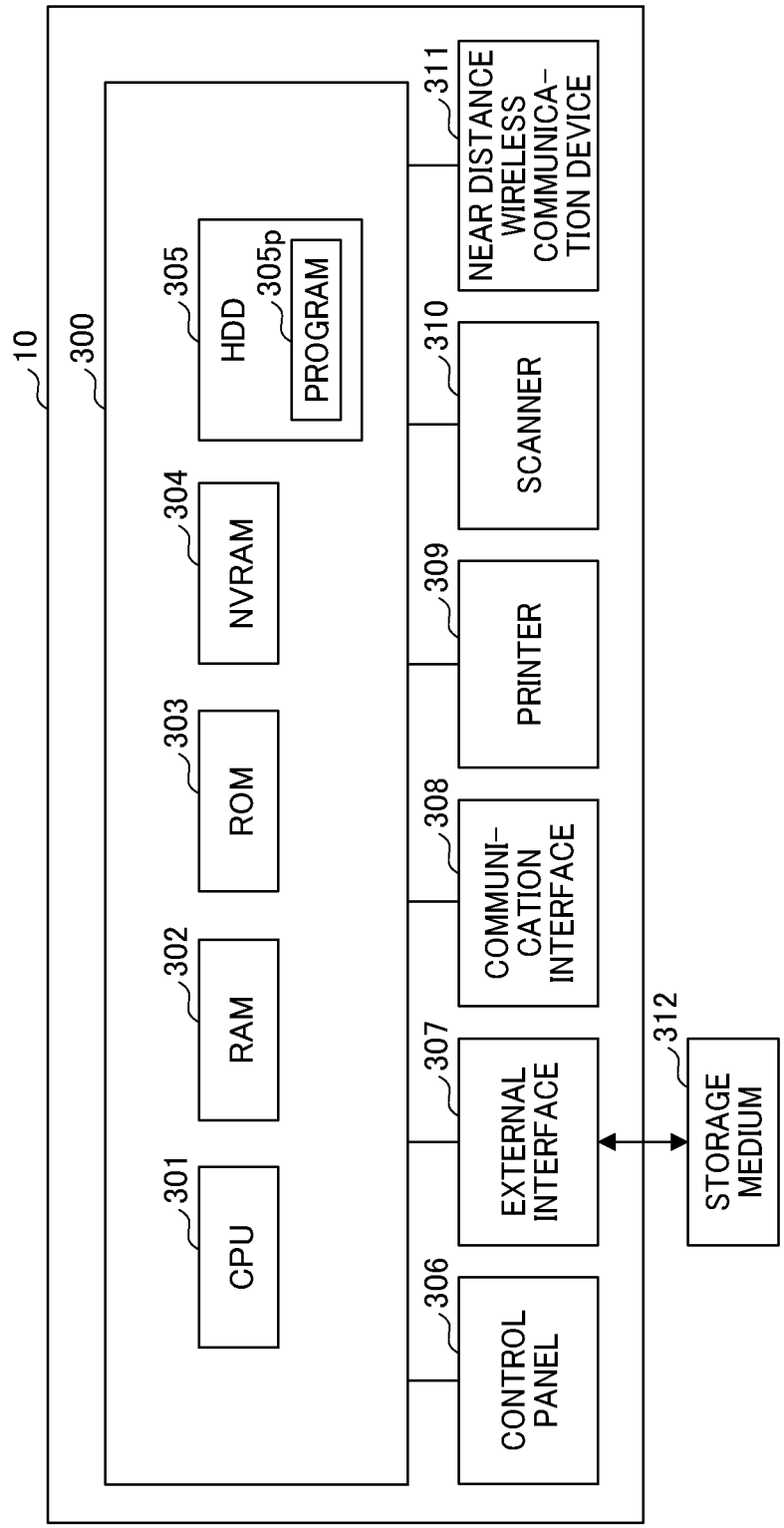
FIG. 4 is a schematic block diagram illustrating an example hardware configuration of a multifunction peripheral, according to an embodiment of the present disclosure.

FIG. 4 is a schematic block diagram illustrating an example hardware configuration of the multifunction peripheral 10. The multifunction peripheral 10 is implemented by a hardware configuration as illustrated in FIG. 4, for example. The multifunction peripheral 10 includes a controller 300, a control panel 306, an external interface (I/F) 307, a communication I/F 308, a printer 309, a scanner 310, a near distance wireless communication device 311.

The controller 300 includes a CPU 301, a random access memory (RAM) 302, a read only memory (ROM) 303, a non-volatile random access memory (NVRAM) 304, and an HDD 305. The ROM 303 stores various programs and data. The RAM 302 stores programs and data temporarily. The NVRAM 304 stores setting information, etc., for example. The HDD 305 stores a program 305p and data. The program 305p includes the application 5.

The CPU 301 performs processing according to the program 305a, data, setting information, etc., read from the ROM 303, the NVRAM 304, the HDD 305, etc., onto the RAM 302 to perform an entire operation of the multifunction peripheral 10 or implement functions of the multifunction peripheral 10.

The control panel 306 includes an input device that receives inputs from a user, and a display device that displays various types of information. Examples of the control panel 306 include a liquid crystal display having a touch panel. The external I/F 307 is an interface with an external device. Examples of the external device include a storage medium 312. Examples of the storage medium 312 include a flexible disc, a compact disc (CD), a digital versatile disc (DVD), a SD memory card, and a USB memory.

The communication I/F 308 is an interface that enables the multifunction peripheral 10 to perform communication via a network. More specifically, in the present embodiment, the communication I/F 308 enables the multifunction peripheral 10 to communicate with any of the apparatuses in the service provision environment 9 via the network N1.

The printer 309 is a printing device that prints an image based on print target data for output. The scanner 310 is a reading device that optically scans a document for to convert the document into electronic data.

The near distance wireless communication device 311 is a communication device complying with communication standards such as Near Field Communication (NFC) or Bluetooth (registered trademark). The near distance wireless communication device 311 complying with the NFC is sometimes called a reader/writer.

The multifunction peripheral 10 according to the present embodiment implements processes as described later with the above hardware configuration.

<Functions of the Multifunction Peripheral 10>

Figure 5:
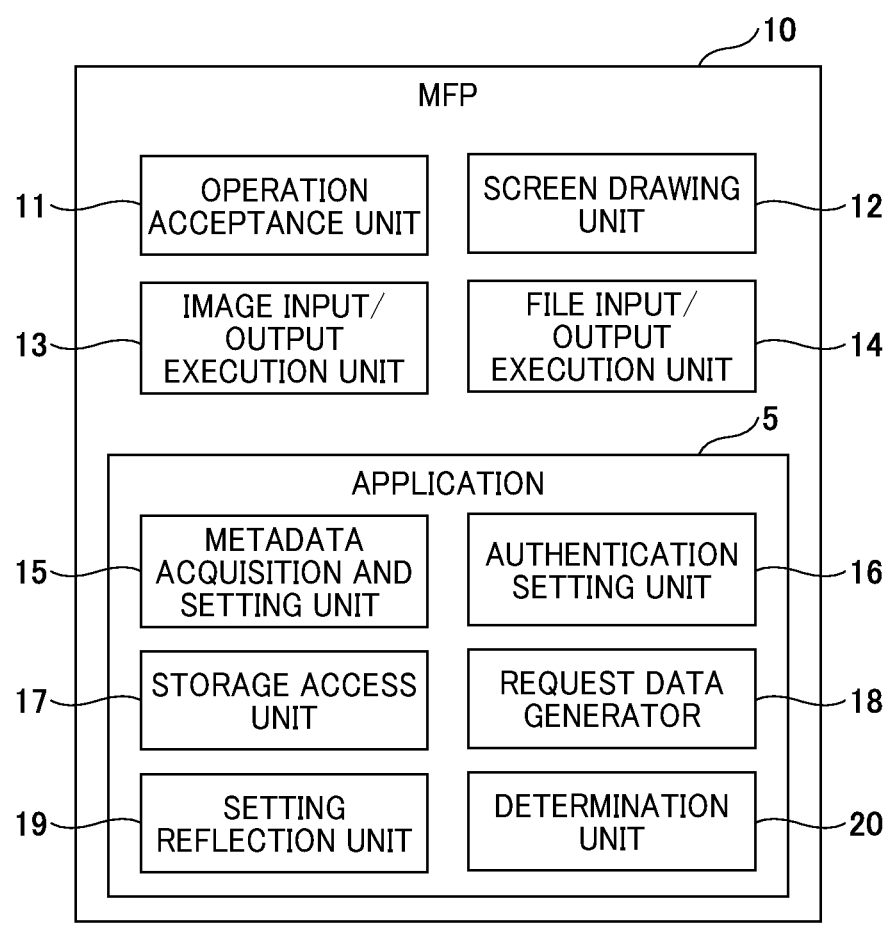
FIG. 5 is a schematic block diagram illustrating an example functional configuration of the multifunction peripheral, according to an embodiment of the present disclosure.

FIG. 5 is a schematic block diagram illustrating an example functional configuration of the multifunction peripheral 10. The multifunction peripheral 10 has functions implemented by an operation acceptance unit 11, a screen drawing unit 12, an image input/output execution unit 13, a file input/output execution unit 14, and functions implemented by the application 5.

These functional units of the multifunction peripheral 10 are functions that are implemented by operating one or more hardware elements illustrated in FIG. 4 in cooperation with instructions of the CPU 301 according to the program 305p described in a script language acquired from the content providing service apparatus 60 and the program 305p expanded from the HDD 305 to the RAM 302.

The application 5 is software that enables the service provision environment 9 and the multifunction peripheral 10 to cooperate with each other, thereby enabling the multifunction peripheral 10 to provide a user with the device coordination service using the cloud storage 30. Software other than the application 5 may be executed by the multifunction peripheral 10. This application 5 is sometimes referred to as a personal application, because users are able to configure settings personally. The application 5 includes a metadata acquisition/setting unit 15, an authentication setting unit 16, a storage access unit 17, a request data generator 18, a setting reflection unit 19, and a determination unit 20.

These functional units of the application 5 are functions that are implemented by operating one or more hardware elements illustrated in FIG. 4 in cooperation with instructions of the CPU 301 according to the application 5 (a part of the program 305p) expanded from the HDD 305 to the RAM 302. The application 5 may be distributed from a server for program distribution. Alternatively, the application 5 may be distributed as being stored in a storage medium.

Further, the functions of the application 5 and the functions of the multifunction peripheral 10 may not be strictly divided. In other words, it is sufficient that the multifunction peripheral 10 has functions including the functions that the application 5 provides.

The authentication setting unit 16 is implemented by the CPU 301 of FIG. 4 executing the program 305p. The authentication setting unit 16 requests the authentication service apparatus 70 for authentication for accessing the cloud storage 30. The authentication setting unit 16 accepts login information of a user and transmits the accepted the login information to the authentication service apparatus 70. Further, the authentication setting unit 16 accesses the cloud storage 30 for a storage link, to request authentication. When authenticated, the authentication setting unit 16 instructs the cloud storage 30 to configure settings relating to the storage link in the personal information of the authentication service apparatus 70. The storage link includes authentication information that enables the user to log in the cloud storage 30. As a result, a user is able to access the cloud storage 30 that the user him- or herself uses.

The metadata acquisition/setting unit 15 is implemented by the CPU 301 of FIG. 4 executing the program 305p to control the communication I/F 308. The metadata acquisition/setting unit 15 acquires, from the metadata generation service apparatus 50, metadata based on which the multifunction peripheral 10 sends a request to the input/output service apparatus 40. Further, the metadata acquisition/setting unit 15 sets the metadata set by the user in the metadata generation service apparatus 50.

The storage access unit 17 is implemented by the CPU 301 of FIG. 4 executing the program 305p to control the communication I/F 308. The storage access unit 17 accesses the cloud storage 30. This enables the multifunction peripheral 10 to display folders of the cloud storage 30 and files as print targets. The input and output of file to and from the cloud storage 30 is performed via the input/output service apparatus 40.

The setting reflection unit 19 is implemented by the CPU 301 of FIG. 4 executing the program 305p. The setting reflection unit 19 sets, in the multifunction peripheral 10, a folder as a destination to which image data is to be distributed and scan conditions that are set by a user in the application 5, and stores the folder and scan conditions.

The request data generator 18 is implemented by the CPU 301 of FIG. 4 executing the program 305p. The request data generator 18 generates request data to be sent to the input/output service apparatus 40 based on the metadata. Since a default storage destination (folder) is set in the metadata, the user selects or creates a storage destination based on the default folder. Using the information set in the metadata, the request data generator 18 generates request data that designates a folder in which image data is to be stored or a file to be acquired.

The screen drawing unit 12 is implemented by the CPU 301 of FIG. 4 executing the program 305p. The screen drawing unit 12 controls the control panel 306 to display a user interface using screen information transmitted from the content providing service apparatus 60. The screen drawing section 12 has functions of browser software. The screen drawing unit 12 acquires, from the content providing service apparatus 60, screen information described in HTML, CSS and JavaScript (registered trademark), and displays a screen of the application 5 on the control panel 306.

The operation acceptance unit 11 is implemented by the CPU 301 of FIG. 4 executing the program 305p. The operation acceptance unit 11 accepts operations to the control panel 306 (touch panel) and hardware keys. More specifically, the operation acceptance unit 11 accepts operations by a user, such as selecting a folder as a destination to which image data is to be distributed, changing the scan conditions, selecting a file for printing, changing print conditions, and starting execution of a job.

The image input/output execution unit 13 is implemented by the CPU 301 of FIG. 4 executing the program 305p to control the scanner 310. The image input/output execution unit 13 scans a document to generate image data.

The file input/output execution unit 14 is implemented by the CPU 301 of FIG. 4 executing the program 305p. The file input/output execution unit 14 uploads the image data generated by scanning, based on the request data. Further, when the multifunction peripheral 10 performs printing, the file input/output execution unit 14 sends request data including a file selected by a user and print conditions to the input/output service apparatus 40, and downloads a file for printing that is generated by the input/output service apparatus 40.

<<Authentication Service Apparatus 70>>

Figure 6A:
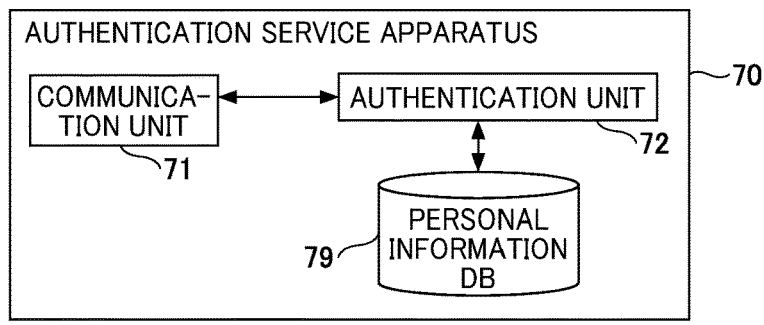
FIGS. 6A to 6E are block diagrams illustrating example functional configurations of apparatuses in the service provision environment, according to an embodiment of the present disclosure.

FIG. 6A is a schematic block diagram illustrating an example functional configuration of the authentication service apparatus 70. The authentication service apparatus 70 includes a communication unit 71 and an authentication unit 72. These functions of the authentication service apparatus 70 are functions that are implemented by operating one or more hardware elements illustrated in FIG. 3 in cooperation with instructions of the CPU 201 according to the program 209p expanded from the HDD 209 to the memory 202. In addition, the authentication service apparatus 70 includes a personal information database (DB) 79 implemented by the HDD 209 or the memory 202.

The communication unit 71 is implemented by the CPU 201 of FIG. 3 executing the program 209p to control the network driver 205. The communication unit 71 exchanges data via a network. The authentication unit 72 is implemented by the CPU 201 of FIG. 3 executing the program 209p. The authentication unit 72 authenticates a user based on the login information transmitted from the multifunction peripheral 10.

FIG. 7 illustrates a part of the personal information stored in the personal information DB 79. In FIG. 7, the rest of the personal information other than that used in the present embodiment is omitted. As described later, once a user logs in the device coordination system 100, the multifunction peripheral 10 is able to acquire the personal information of FIG. 7. In the personal information, the cloud storage 30 to be used by a user and the authentication information for login are set.

"userID" is information for identifying a user. An ID is an abbreviation for identification, and means an identifier or identification information. The ID is a name, a symbol, a character string, a numerical value, or a combination of at least two of these items for identifying a specific object from among a plurality of objects. The same applies to IDs other than the user ID.

"familyName" is a name of a department to which the user belongs, for example.

"givenName" is a name of the user when displayed.

"mailAddresses" is an email address of the user.

"locale" is a country or region where the user is.

"timezone" is a time zone of the country or region where the user is.

"authentication" is the settings related to the storage link of the cloud service. In addition, "authentication" is authentication information based on which the user logs in the cloud storage 30. The personal information can have settings related to a plurality of storage links.

"spId" is called a system ID, which is information for identifying the cloud storage 30.

"authID" is identification information for identifying the user in this cloud service.

The settings related to the storage link are configured in accordance with an operation by a user or an administrator to the information processing apparatus 6 or the multifunction peripheral 10.

<<Metadata Generation Service Apparatus 50>>

Figure 6B:
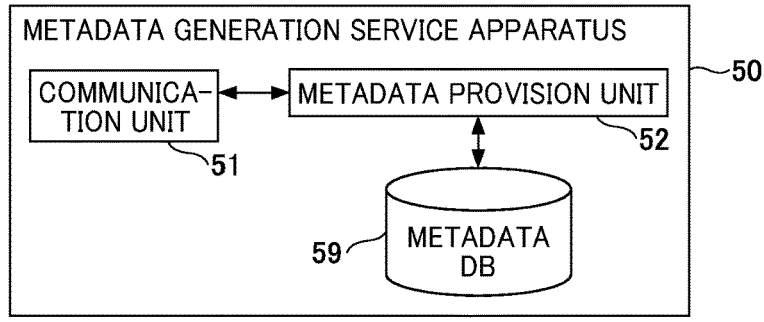

FIG. 6B is a schematic block diagram illustrating an example functional configuration of the metadata generation service apparatus 50. The metadata generation service apparatus 50 includes a communication unit 51 and a metadata provision unit 52. These functions of the metadata generation service apparatus 50 are functions that are implemented by operating one or more hardware elements illustrated in FIG. 3 in cooperation with instructions of the CPU 201 according to the program 209p expanded from the HDD 209 to the memory 202. In addition, the metadata generation service apparatus 50 includes a metadata DB 59 implemented by the HDD 209 or the memory 202.

The communication unit 51, which is implemented by the CPU 201 of FIG. 3 executing the program 209p to control the network driver 205, exchanges data via a network. The metadata provision unit 52 is implemented by the CPU 201 of FIG. 3 executing the program 209p. The metadata provision unit 52 reads out, from the metadata DB 59, metadata associated with the user ID transmitted from the multifunction peripheral 10, and provides this metadata to the multifunction peripheral 10.

FIG. 8 is an example of the metadata of the application 5 acquired from the metadata generation service apparatus 50. Although the metadata is associated with the user ID, the user ID is omitted in FIG. 8.

Metadata is data about certain data (information related to certain data). In the present embodiment, the metadata is settings of each user regarding operation of the application 5. The metadata is provided corresponding to the types of the application 5 (scan application, print application, etc.) operating on the multifunction peripheral 10. In the metadata, initial values of scanning and printing that are to be set in the application 5 are set. As one of the initial values, the cloud storage 30 to be used and a default folder of the cloud storage 30 are set.

The request data generator 18 refers to the metadata (for example, the cloud storage 30 or the folder) to generate a request to the input/output service apparatus 40. The metadata also includes information defining which process flow of the input/output service apparatus 40 is to be called by the application 5.

An item "service" in an item "storage" is the cloud storage 30 used by the application 5. In a case in which a user has not set the cloud storage 30, this item is empty.

"rootFolderId" in an item "common" indicates a folder (default folder), which is first referred to in the cloud storage 30. The "rootFolderId" is referred to when the multifunction peripheral 10 is to display a list of folders in which image data obtained by scanning is to be stored or a list of files as print targets.

"uploadErrorMailAddress" is an address of an email to which an error notification is to be sent.

In "scanColor", a full-color or monochrome mode is set as the scan condition applied when the multifunction peripheral 10 performs scanning. This setting is a default value.

"scanResolution" is resolution, which is also the scan condition.

"fileFormat" is a format of a file.

"mailSubject" is a subject of an email to be sent.

"mailbody" is text described in an email body.

"documentFormat" is a format of image data.

Since the cloud storage 30 and default folder used by the user are thus set, the user is able to use his or her desired folder of the cloud storage 30.

Further, the user operates a browser of the information processing apparatus 6 or multifunction peripheral 10 to access the metadata generation service apparatus 50, thereby setting the above-described metadata. In a case in which the application 5 is a printing application, the default settings of print conditions may be stored in "common".

<<Content Providing Service Apparatus 60>>

Figure 6C:
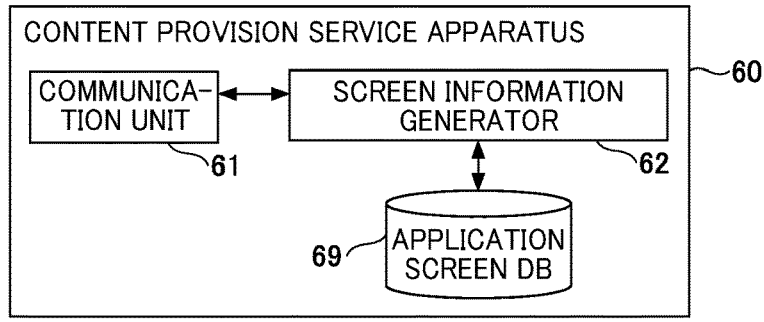

FIG. 6C is a schematic block diagram illustrating an example functional configuration of the content providing service apparatus 60. The content providing service apparatus 60 includes a communication unit 61 and a screen information generator 62. These functions of the content providing service apparatus 60 are functions that are implemented by operating one or more hardware elements illustrated in FIG. 3 in cooperation with instructions of the CPU 201 according to the program 209p expanded from the HDD 209 to the memory 202. Further, the content providing service apparatus 60 has an application screen DB 69 implemented by the HDD 209 or the memory 202.

The communication unit 61, which is implemented by the CPU 201 of FIG. 3 executing the program 209p to control the network driver 205, exchanges data via a network.

The screen information generator 62 is implemented by the CPU 201 of FIG. 3 executing the program 209p. The screen information generator 62 reads out, from the application screen DB 69, an HTML, CSS, and script language program suitable for the application 5 according to the type of the application 5 being executed by the multifunction peripheral 10, and provides the read-out HTML, CSS, or script language to the multifunction peripheral 10.

<<Input/Output Service Apparatus 40>>

Figure 6D:
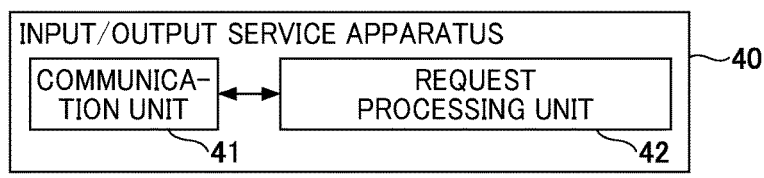

FIG. 6D is a schematic block diagram illustrating an example functional configuration of the input/output service apparatus 40. The input/output service apparatus 40 includes a communication unit 41 and a request processing unit 42. These functions of the input/output service apparatus 40 are functions that are implemented by operating one or more hardware elements illustrated in FIG. 3 in cooperation with instructions of the CPU 201 according to the program 209p expanded from the HDD 209 to the memory 202.

The communication unit 41, which is implemented by the CPU 201 of FIG. 3 executing the program 209p to control the network driver 205, exchanges data via a network. The request processing unit 42 is implemented by the CPU 201 of FIG. 3 executing the program 209p. The request processing unit 42 analyzes a request transmitted from the multifunction peripheral 10 to select the cloud storage 30. The request processing unit 42 transmits a file (image data) to the selected cloud storage 30, or reads out a file from the selected cloud storage 30.

<<Cloud Storage 30>>

Figure 6E:
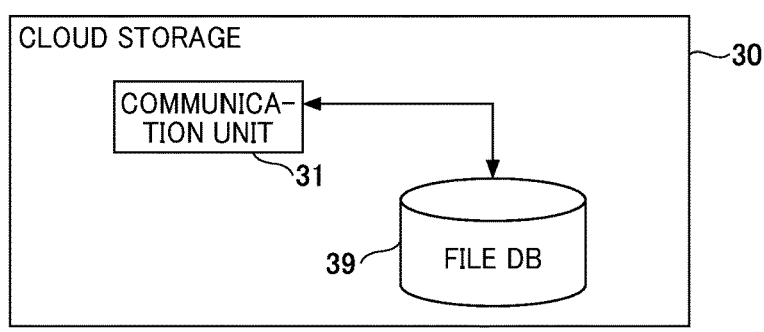

FIG. 6E is a schematic block diagram illustrating an example functional configuration of the cloud storage 30. The cloud storage 30 includes a communication unit 31. This function of the cloud storage 30 is a function that is implemented by operating one or more hardware elements illustrated in FIG. 3 in cooperation with instructions of the CPU 201 according to the program 209p expanded from the HDD 209 to the memory 202. Further, the cloud storage 30 includes a file DB 39 implemented by the HDD 209 or the memory 202.

The communication unit 31, which is implemented by the CPU 201 of FIG. 3 executing the program 209p to control the network driver 205, exchanges data via a network.

The file DB 39 has a plurality of folders having a tree structure with a root folder as a starting point. A user's file is stored in each folder. The folder may be referred to as a directory.

<Outline of Process>

FIGS. 9A and 9B are a sequence diagram illustrating an example of a process performed by the device coordination system 100 when a user uses the device coordination system 100. It is assumed that the personal information and the metadata have already been set.

S1: A user operates the multifunction peripheral 10 to display a home screen. The home screen is a screen that enables a user to select several applications including the application 5 operating on the multifunction peripheral 10.

S2: The user performs a login operation for using the multifunction peripheral 10 as individual user. For example, the user inputs a user ID and a password of the user for authentication. The operation acceptance unit 11 accepts this operation.

S3: The authentication setting unit 16 transmits login information (for example, the user ID and password) to the authentication service apparatus 70. The authentication unit 72 of the authentication service apparatus 70 authenticates the user based on the login information. When the user is authenticated, the authentication unit 72 transmits personal information that is read from the personal information DB 79 to the multifunction peripheral 10. The IP address and port number of the authentication service apparatus 70 are set in advance. When the user skips over the login operation to select the application 5, the screen drawing unit 12 causes the current screen to transition to a login screen to invite the user to perform the login operation.

S4: When the user is authenticated, the authentication setting unit 16 acquires the personal information from the authentication service apparatus 70.

S5: The user who has successfully logged in the multifunction peripheral 10 selects an icon of the application 5 to start use of the application 5.

S6: The operation acceptance unit 11 accepts the selection of icon of the application 5 and causes the application 5 to activate.

S7, S8: When the application 5 is activated, the screen drawing unit 12 acquires, from the content providing service apparatus 60, screen information including the HTML, script language, CSS of the activated application 5. The screen information generator 62 of the content providing service apparatus 60 reads out the screen information from the application screen DB 69 according to the type of the application 5 and provides the read-out information to the multifunction peripheral 10.

S9: Next, the metadata acquisition/setting unit 15 designates the user ID, etc., to request the metadata generation service apparatus 50 for metadata, which are settings of each user regarding the operation of the application 5. The metadata provision unit 52 of the metadata generation service apparatus 50 reads out the metadata from the metadata DB 59 based on the user ID.

S10: Subsequently, the application 5 performs an activation process, described later with reference to FIGS. 10 and 11.

S11: Once the application 5 is activated, the storage access unit 17 logs in the cloud storage 30 that is set in the metadata, using the storage link (authentication information) of the personal information. The storage access unit 17 designates "rootFolderId" of the cloud storage 30 set in the metadata, to acquire a list. Further, the storage access unit 17 controls the control panel 306 to display the acquired list. The content of this list varies depending on the application 5. For example, a list of folders is acquired in a case in which the application 5 is a scan application. In a case in which the application 5 is a print application, a list of files is acquired.

S12: The user selects a target from the list displayed on the control panel 306, depending on the purpose, such as a type of processing to be performed using a specific application. For example, in a case in which the application 5 is a scan application, the user selects a folder in which a scan result is to be stored. In a case in which the application 5 is a print application, the user selects a file to be printed. The operation acceptance unit 11 accepts this user's selection.

S13: After selecting the target, the user performs an operation for starting execution of a process. The operation acceptance unit 11 accepts the operation for starting the execution of process.

S14: First, the request data generator 18 generates request data to be transmitted to the input/output service apparatus 40. For example, in a case in which scan is performed, the request data includes image data, a storage destination, which is selected by the user based on a default folder, and processes to be executed after the data storage. Examples of the process after the data storage include whether an email transmission is to be performed. The user is able to select whether to transmit email after the data storage. An email address is included in the metadata. In a case in which printing is performed, the request data includes a target data selected by the user and the printing conditions. The default settings of the printing conditions are included in the metadata, and the user is able to change the default settings individually.

S15: The file input/output execution unit 14 acquires the request data from the request data generator 18, and transmits the acquired request data to the input/output service apparatus 40.

S16: In response to receiving the request data, the request processing unit 42 of the input/output service apparatus 40 performs an input and output process to and from the cloud storage 30 in accordance with the content of the request data. More specifically, in the scan application, the request processing unit 42 stores the image data in the cloud storage 30. In the print application, the request processing unit 42 reads out the target file.

S17: The input/output service apparatus 40 converts the target file into print data (PDL), in a case in which the application 5 is print application. In a case in which the application 5 is a print application, the input/output service apparatus 40 performs post-processes, e.g., emailing the result.

<<Application Activation Process>>

Figure 10:
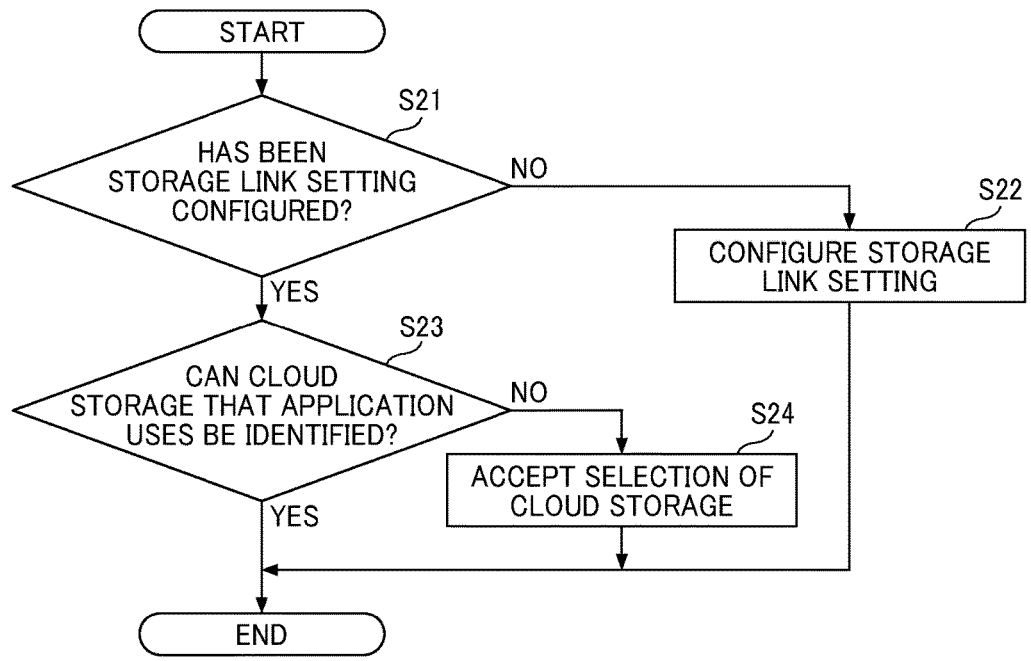
FIG. 10 is a flowchart illustrating an example of a process performed by the multifunction peripheral when an application is activated, according to an embodiment of the present disclosure.

FIG. 10 is a flowchart illustrating an example of a process performed by the multifunction peripheral 10 when the application 5 is activated. The process of FIG. 10 is performed at S10 of FIG. 9A.

The determination unit 20 of the multifunction peripheral 10 refers to the personal information to determine whether the storage link is set in the personal information (S21). In other words, the determination unit 20 determines whether or not any value is set in "authentication" of the personal information.

When the determination unit 20 determines that no storage link is set (S21: NO), the metadata acquisition/setting unit 15 starts a storage link process (S22). The storage link process is a process of setting a storage link in "authentication" of the personal information. This enables a user to set the storage link, in a case in which the value of "authentication" is not set in the personal information. A detailed description is given later of the process of setting the storage link performed at S22, with reference to FIG. 13.

When the determination unit 20 determines that the storage link is set in the personal information (S21: YES), the determination unit 20 refers to the metadata acquired from the metadata generation service apparatus 50 to determine whether it is possible to specify one cloud storage 30 (S23). A detailed description is given later of the process of specifying the cloud storage 30 performed at S23, with reference to FIG. 11.

When the determination unit 20 determines that it is possible to specify one cloud storage 30 (S23: YES), S11 of FIG. 9A is performed on the cloud storage 30 whose value is set in the "storage" of the metadata.

When the determination unit 20 determines that it is not possible to specify one cloud storage 30 (S23: NO), it means that no value is set in "storage" of the metadata and a plurality of storage links are set in the personal information. In this case, the screen drawing unit 12 displays a screen that enables a user to select one storage from the plurality of cloud storages 30 set in the personal information (S24). The user operates the multifunction peripheral 10 (the browser of the multifunction peripheral 10) to set the cloud storage 30 to be used.

<<Process of Specifying Cloud Storage 30>>

Figure 11:
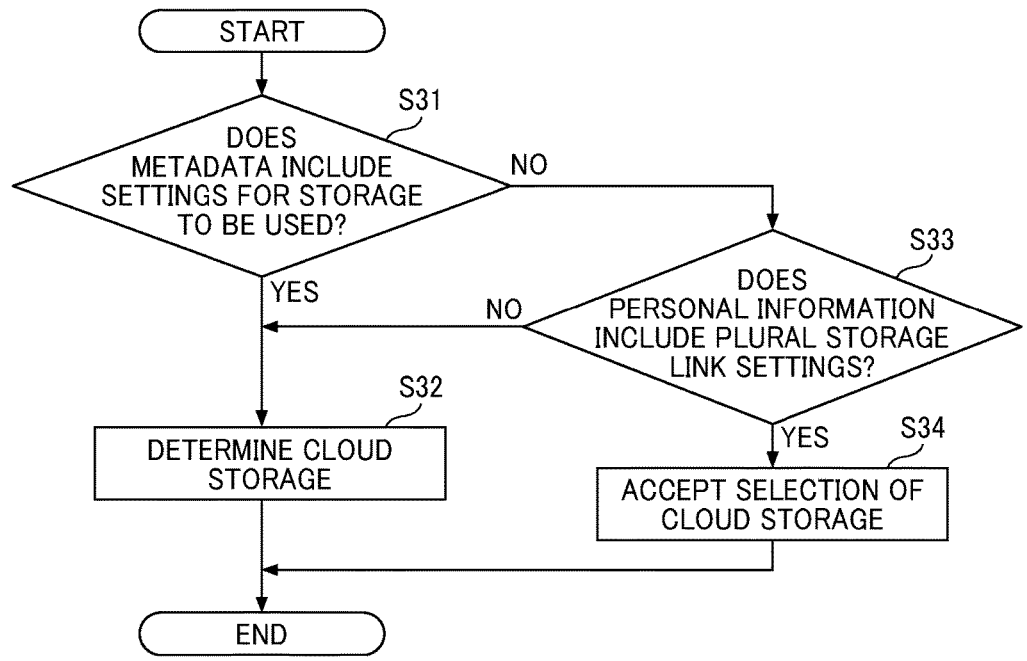
FIG. 11 is a flowchart illustrating an example of a process performed when the application specifies a cloud storage, according to an embodiment of the present disclosure.

FIG. 11 is a flowchart illustrating an example of a process performed when the application 5 specifies the cloud storage 30. The process of FIG. 11 illustrates a more detailed steps of the determination performed at S23 of FIG. 10.

First, the determination unit 20 determines whether or not the cloud storage 30 to be used is set in the metadata acquired from the metadata generation service apparatus 50 (S31).

In a case in which the cloud storage 30 is set in the metadata (S31: YES), the determination unit 20 identifies the set cloud storage 30 as a communication destination (S32). Therefore, among the one or more storage links of the personal information, the cloud storage 30 set in the metadata is used. This enables a user to use his/her desired cloud storage 30.

In a case in which the cloud storage 30 is not set in the metadata (S31: NO), the determination unit 20 determines whether or not a plurality of storage links are set in the personal information (S33).

In a case in which only one storage link is set in the metadata (S33: NO), the determination unit 20 identifies the cloud storage 30 set in the personal information as a communication destination (S32). In this case, the root folder is a folder to be connected. Thus, even in a case in which the cloud storage 30 is not set in the metadata, the multifunction peripheral 10 is able use the cloud storage 30 set in the personal information.

When the personal information includes a plurality of storage link settings (S33: YES), the screen drawing unit 12 controls the control panel 306 to display a screen that enables a user to select a storage (S34). In other words, as described above with reference to S24 of FIG. 10, the screen drawing unit 12 displays a plurality of storage links of the personal information on the control panel 306. The user selects his/her desired cloud storage 30 on (the browser of) the multifunction peripheral 10. The operation acceptance unit 11 accepts the user's operation. Thus, in a case in which a plurality of storage links are set in the personal information while no storage link is set in the metadata, a user is able to select the cloud storage 30 to be linked when using the multifunction peripheral 10.

<Storage Link Setting>

Figure 12:
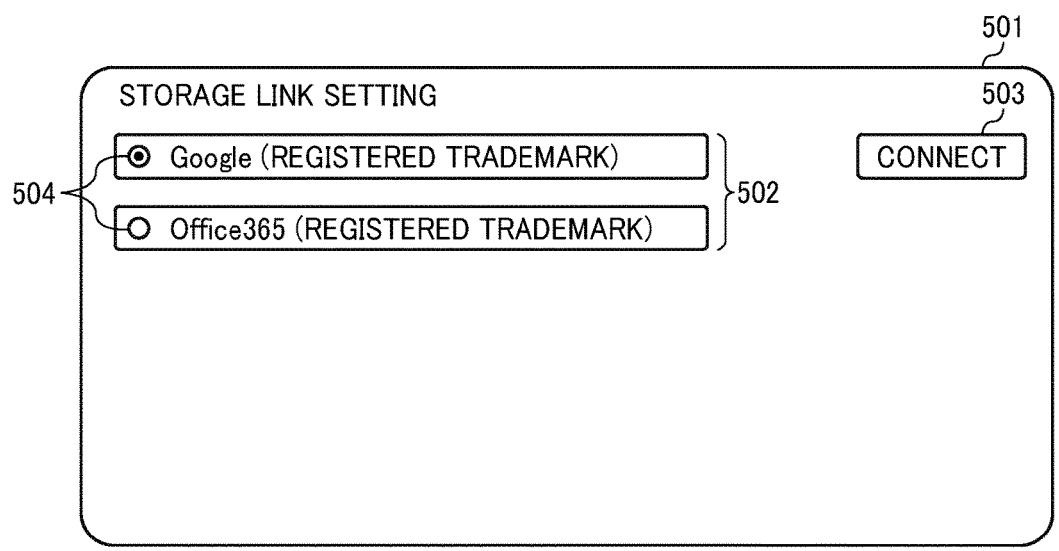
FIG. 12 illustrates an example of a storage link setting screen, according to an embodiment of the present disclosure.
Figure 13:
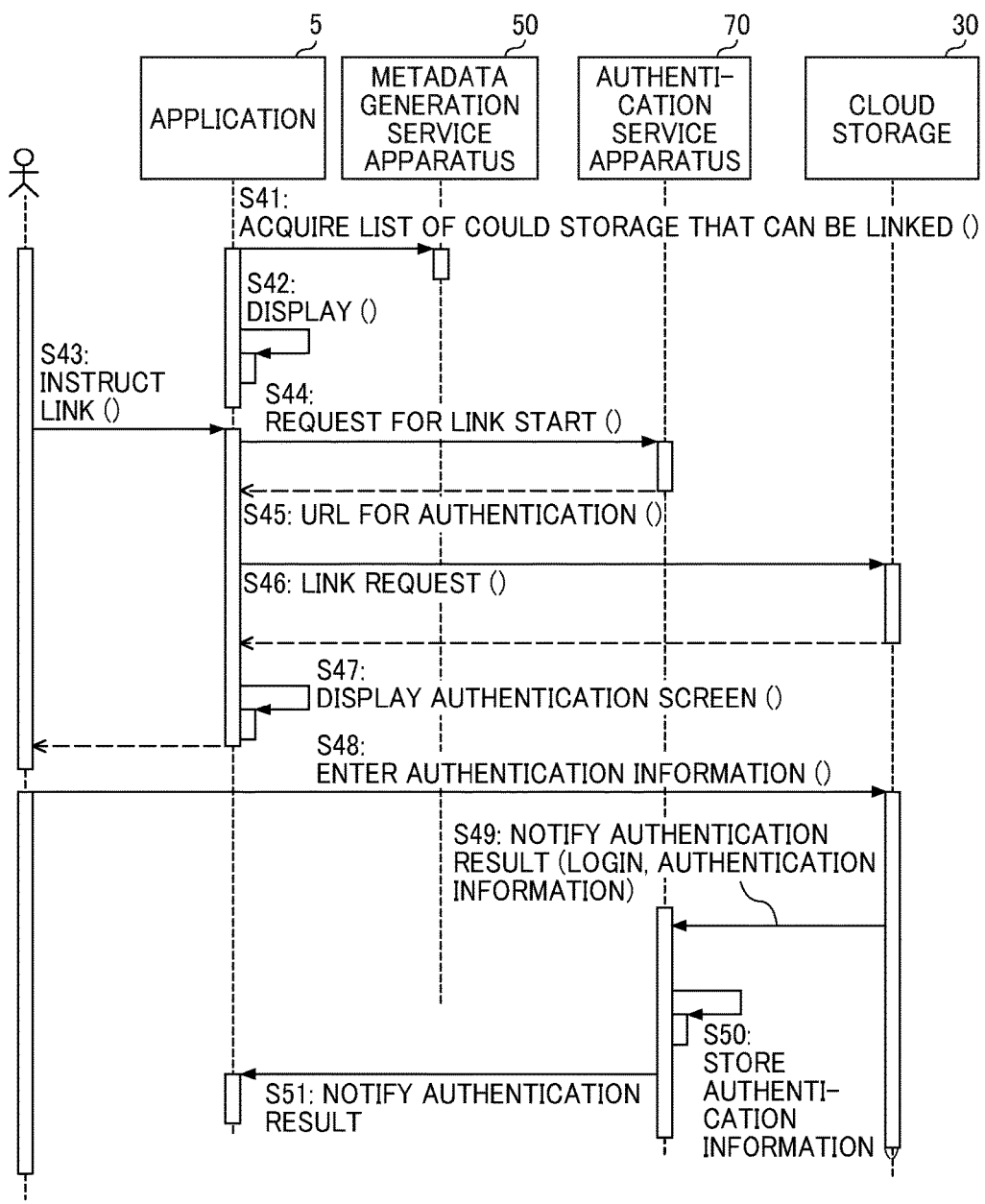
FIG. 13 is a sequence diagram illustrating an example of a process of setting a storage link, according to an embodiment of the present disclosure.

A description is given hereinafter of the process of setting the storage link performed at S22 of FIG. 10, with reference to FIGS. 12 and 13. FIG. 12 illustrates an example of a storage link setting screen 501. FIG. 13 is a sequence diagram illustrating an example of a process of setting a storage link. This process of setting the storage link is performed at S22 of FIG. 10 (that is, S10 of FIG. 9A). In addition, this process is started when a user performs an operation of setting the storage link.

The storage link setting screen 501 includes a storage selection field 502 and a "LINK" button 503. In the storage selection field 502, the names of the cloud storages 30 that can be set by the user and radio buttons 504 are displayed. A user presses the radio button 504 of the cloud storage 30 that the user wants to use to select the cloud storage 30. The operation acceptance unit 11 accepts this user's operation, and acquires the selected cloud storage 30.

When the user presses the "LINK" button 503, the operation acceptance unit 11 accepts this operation by the user. In response to the user's operation accepted by the operation acceptance unit 11, the authentication setting unit 16 transmits a request for starting authentication to the authentication service apparatus 70 together with the identification information of the selected cloud storage 30.

<<Process of Setting Storage Link>>

A description is given hereinafter of steps in the process of FIG. 13. The process of FIG. 13 is started when the storage link setting is performed at S22 of FIG. 10.

S41: When starting the storage link, the metadata acquisition/setting unit 15 of the application 5 acquires a list of the cloud storages 30 that can be linked from the metadata generation service apparatus 50.

S42: The screen drawing unit 12 controls the control panel 306 to display the list of the cloud storages 30. Thus, the storage link setting screen 501 as illustrated in FIG. 12 is displayed on the control panel 306.

S43: As described above with reference to FIG. 12, a user selects a service that the user wants to use from the displayed list of cloud storages 30, and presses the "LINK" button 503 of the selected cloud storage 30.

S44: The operation acceptance unit 11 accepts this user's operation. In response to the acceptance of operation by the operation acceptance unit 11, the authentication setting unit 16 transmits, to the authentication service apparatus 70, a request for starting a storage link, together with the identification information of the selected cloud storage 30.

S45: The authentication service apparatus 70 transmits, to the multifunction peripheral 10, an URL for authentication of the cloud storage 30 designated by the request for starting the storage link. The URL for authentication contains an address that enables the multifunction peripheral 10 to communicate with the cloud storage 30. The URL for authentication is predetermined for each cloud storage 30.

S46: The authentication setting unit 16 of the multifunction peripheral 10 connects to the acquired URL for authentication to transmit a link request to the cloud storage 30.

S47: The authentication setting unit 16 passes the screen information acquired from the cloud storage 30 to the screen drawing unit 12. The screen drawing unit 12 controls the control panel 306 to displays an authentication screen provided by the cloud storage 30.

S48: The user enters required items on the displayed authentication screen. The required items are the authentication information for logging in the cloud storage 30 and login information for the cloud storage 30 to log in the authentication service apparatus 70. The user knows the authentication information for using the cloud storage 30 in advance. In a case in which the user does not have the authentication, the user creates the information. In addition, the login information is used by the cloud storage 30 to set the storage link to the personal information of this user in the authentication service apparatus 70. The operation acceptance unit 11 accepts the information entered via the authentication screen. The authentication setting unit 16 transmits the authentication information and the login information to the cloud storage 30.

S49: The cloud storage 30 logs in the authentication service apparatus 70 using the login information, and notifies the authentication service apparatus 70 with an authentication result indicating whether the cloud storage 30 has authenticated the user for login. In addition, the cloud storage 30 transmits the authentication information to the authentication service apparatus 70 together with the authentication result.

S50: In a case in which the received authentication result indicates that the cloud storage 30 has authenticated the user, the authentication service apparatus 70 stores the authentication information. Thus, the storage link is set in the "authentication" of the personal information. In a case in which the received authentication result indicates that the authentication has failed, the authentication service apparatus 70 does not store the authentication information.

S51: The authentication service apparatus 70 transmits the authentication result to the application 5 of the multifunction peripheral 10.

With the process as described above, the storage link is set in the personal information. Thereafter, the application 5 is activated at S10 of FIG. 9A.

Thereafter, the user selects the cloud storage 30 to be set in the metadata from the storage setting of the personal information. The multifunction peripheral 10 transmits the name (identification information) of the selected cloud storage 30 to the metadata generation service apparatus 50, thereby the cloud storage 30 to be used by the user being set in the metadata.

<Example of Scan Application Screen>

Figure 14:
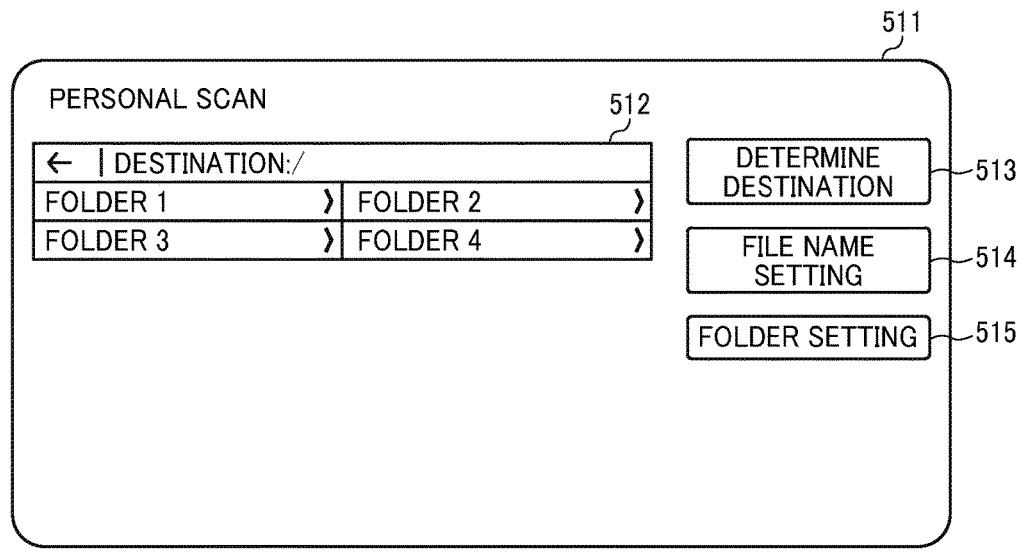
FIG. 14 illustrates an example of a scan screen displayed by a scan application, according to an embodiment of the present disclosure.

A description is given hereinafter of the scan application as an example of the application 5. FIG. 14 illustrates an example of a scan screen 511 displayed by the scan application. The scan screen 511 is displayed at S12 of FIG. 9B. The scan screen 511 includes a folder selection field 512, a distribution destination determination button 513, a file name setting button 514, and a folder setting button 515.

In response to the acquisition of list at S11 of FIG. 9A, the scan application displays a list of cloud storages 30 that are set in the personal information or the metadata.

One or more default folders (rootFolderId) specified by the metadata acquired from the metadata generation service apparatus 50 are displayed in the folder selection field 512. In a case in which the metadata does not specify any folder, the root folder is displayed in the folder selection field 512. When a user selects a desired folder, the operation acceptance unit 11 accepts this selection. In response accepting the selection of folder by the operation acceptance unit 11, the screen drawing unit 12 displays the selected folder.

The distribution destination determination button 513 is a button for determining a folder currently displayed on the control panel 306 as a destination. When the distribution destination determination button 513 is pressed, the screen drawing unit 12 displays a setting screen of scan conditions. The user changes the scanning conditions displayed by default as needed, and starts a scanning process.

The file name setting button 514 is a button for transitioning to a screen that enables a user to set a name of a file obtained by scanning. The folder setting button 515 is a button for transitioning to a folder setting screen 521 as illustrated in FIG. 15.

Figure 15:
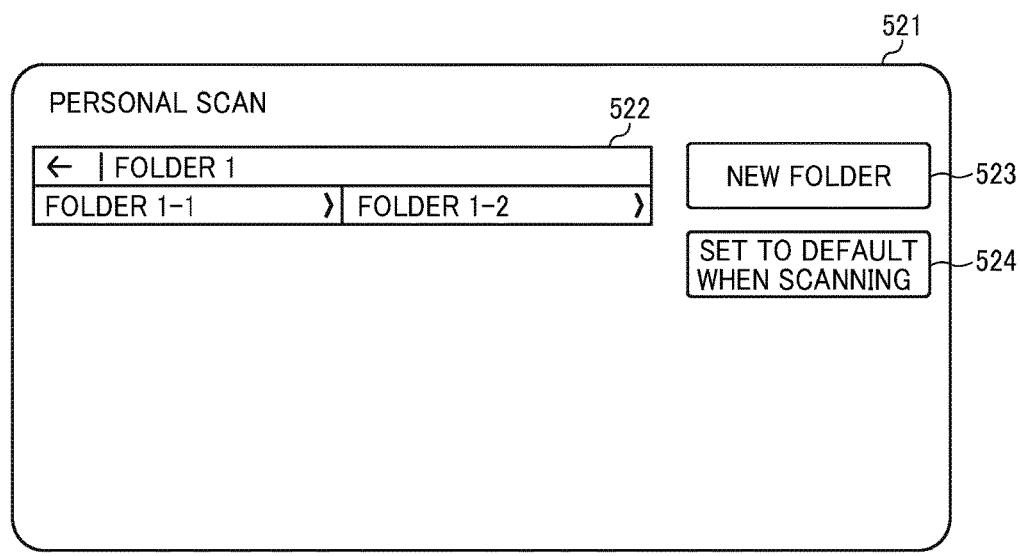
FIG. 15 illustrates an example of a folder setting screen, according to an embodiment of the present disclosure.

FIG. 15 illustrates an example of the folder setting screen 521. The folder setting screen 521 is displayed in response to the folder setting button 515 being pressed. More specifically, when the operation acceptance unit 11 accepts the press of the folder setting button 515, the screen drawing unit 12 controls the control panel 306 to display the folder setting screen 521.

The folder setting screen 521 has a folder selection field 522, a folder creation button 523, and a default setting button 524. The folder selection field 522 is a graphical image, which, when selected, enables a user to select a folder. The folder creation button 523 is a button that enables a user to create a new folder.

When using the scan application, the user sometimes wants to create a new folder as a destination to which image data obtained by scanning is to be transmitted. In this case, the user selects the folder creation button 523 to create a new folder. In a case of the print application, the folder creation button 523 may be omitted. When the user presses the folder creation button 523, the operation acceptance unit 11 accepts this operation. In response to acceptance of this operation by the operation acceptance unit 11, the storage access unit 17 transmits the current folder (the folder, and the path from a route folder) and the new folder (the name and the path) to the cloud storage 30. The cloud storage 30 generates the folder notified from the storage access unit 17.

The default setting button 524 is a button for setting a folder to be displayed first when the application 5 is activated to a folder currently displayed. When the user presses the default setting button 524, the operation acceptance unit 11 accepts this operation. In response to acceptance of this operation by the operation acceptance unit 11, the metadata acquisition/setting unit 15 transmits the current folder (the folder, and the path from a route folder) to the metadata generation service apparatus 50. At this time, the user ID or the like for identifying the user is also transmitted. The metadata generation service apparatus 50 sets the current folder to "rootFolderID" in the metadata of this user. Thus, the user can set the default folder from the application 5.

Figure 16:
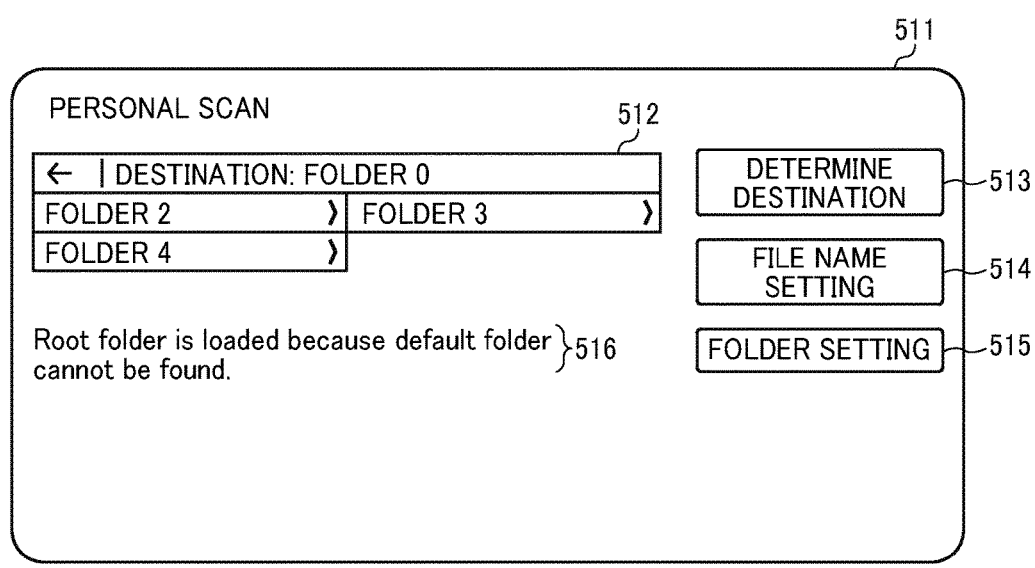
FIG. 16 illustrates another example of the scan screen displayed by the scan application, according to an embodiment of the present disclosure.

FIG. 16 illustrates another example of the scan screen 511 displayed by the scan application. A description is given hereinafter differences between the screen 511 of FIG. 16 and that of FIG. 14. The cloud storage 30 can be accessed not only from the application 5 but also from a browser of a general-purpose information processing apparatus. Accordingly, it is possible to delete the folders, for example. As described above with reference to FIG. 13, a user is able to set a desired folder as a default folder at the time of startup, but this folder may be deleted after being set as default.

FIG. 16 illustrates an example of the scan screen 511 displayed when the default folder is deleted. On the scan screen 511 of FIG. 16, a message 516 "Root folder is loaded because default folder cannot be found." is displayed. In the example of FIG. 16, a root folder is displayed, because a folder 1, which was the default folder, has been deleted.

Although, after the application 5 is activated, the storage access unit 17 tries to acquire a folder that is set as default in the metadata, the storage access unit 17 is notified from the cloud storage 30 that the folder is not found. The screen drawing unit 12 displays the message 516 indicating that the folder has not been found. In addition, when the default folder has not been found, the storage access unit 17 may acquire a list of folders in a root folder. In FIG. 16, folders 2, 3 and 4 in the root folder are displayed, because the folder 1 is not present.

<Handling Error of Storage Link>

The storage link setting becomes invalid when, for example, the cloud storage 30 cancels the link after the multifunction peripheral 10 obtains the metadata. Further, the storage link setting becomes invalid also when the external service deletes the user's account. In this case, the storage access unit 17 is notified of an error when accessing the cloud storage 30. In response to the notification of error, the screen drawing unit 12 controls the control panel 306 to display the content of the error.

Figure 17:
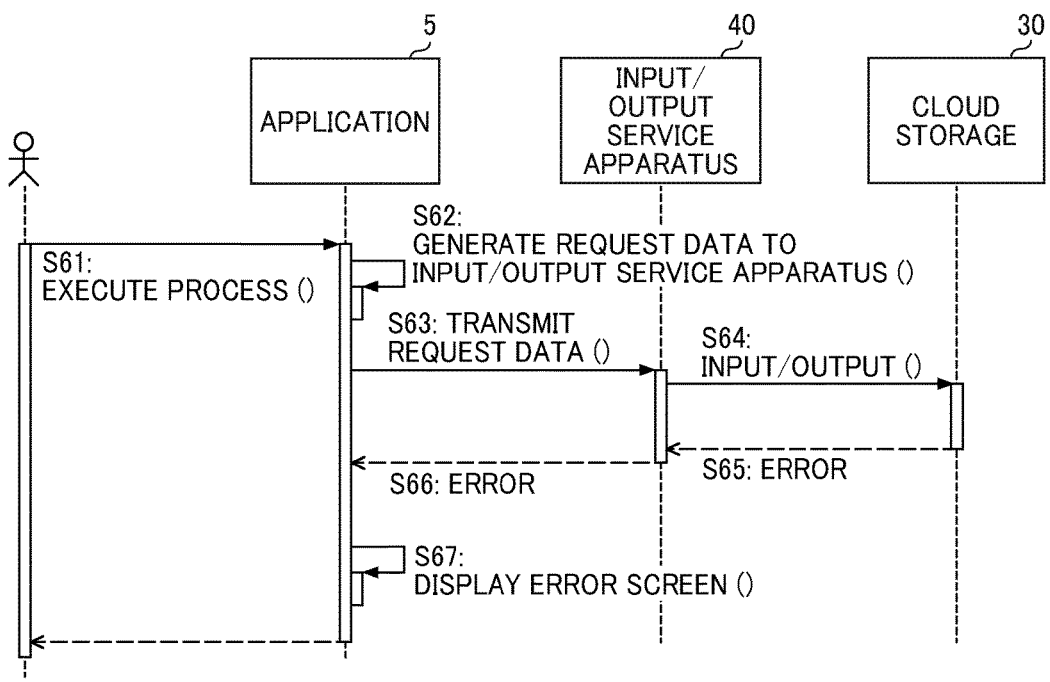
FIG. 17 is a sequence diagram illustrating a process performed in a case in which an error occurs when the multifunction peripheral performs a storage link, according to an embodiment of the present disclosure.

FIG. 17 is a sequence diagram illustrating a process performed in a case in which an error occurs when the multifunction peripheral 10 performs a storage link.

S61 to S64: These steps are the same or substantially the same as those of is process is the same as S13 to S16 of FIG. 9B.

S65: The cloud storage 30 transmits an error notification to the input/output service apparatus 40.

S66: The input/output service apparatus 40 transmits the error notification to the multifunction peripheral 10.

S67: The screen drawing unit 12 controls the control panel 306 to display an error screen 531.

Figure 18:
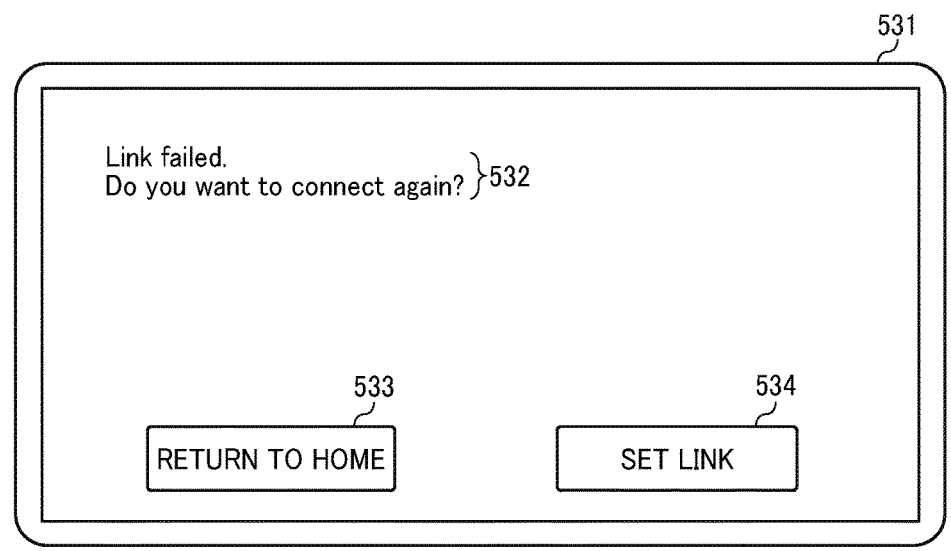
FIG. 18 illustrates an example of an error screen, according to an embodiment of the present disclosure.

FIG. 18 illustrates an example of the error screen 531. The error screen 531 has a message 532 "Link failed. Do you want to connect again?", "RETURN TO HOME" button 533, and a "SET LINK" button 534. The "RETURN TO HOME" button 533 is a button that, when selected, causes the error screen 531 to transition to the home screen. When the operation acceptance unit 11 accepts pressing of the "RETURN TO HOME" button 533, the screen drawing unit 12 controls the control panel 306 to display the home screen. The "SET LINK" button 534 is a button that, when selected, displays the storage link setting screen 501 of FIG. 12, through which a user configures storage link settings. Thus, a user is able to configure storage link settings when error occurs.

As described heretofore, the device coordination system 100 according to the present embodiment accesses the cloud storage 30 specified by the metadata using the authentication information of the personal information, to upload or read out a file to or from the cloud storage 30. A user is able to set the storage setting in the personal information and the default folder of in the metadata. This enables the user to use his or her desired cloud storage 30.

<Variation>

The above-described embodiment is illustrative and do not limit the present disclosure. Thus, numerous additional modifications and variations are possible in light of the above teachings within the scope of the present disclosure. Any one of the above-described operations may be performed in various other ways, for example, in an order different from the one described above.

For example, the device coordination system may be referred to as a workflow system in some cases. A flow of routine tasks and procedures is called a workflow, and a system that automates the workflow using an information processing apparatus is called a workflow system.

In addition, the functional configurations of the multifunction peripheral 10 and the apparatuses in the service provision environment 9 are divided into the functional blocks as illustrated in FIGS. 5 and 6, for example, based on main functions thereof, in order to facilitate understanding the processes performed by the device or the apparatuses. No limitation is intended by how the processes are divided or by the name of the processes. The processes implemented by the multifunction peripheral 10 and the apparatuses in the service provision environment 9 may be divided to a larger number of processes depending on the contents of processes. Further, one process may be divided to include a larger number of processes.

Further, the number of information processing apparatuses implementing the apparatuses in the service provision environment 9 may be designed as appropriate.

The metadata generation service apparatus 50 is an example of an operation information storage apparatus.

According to embodiments of the present disclosure, a device coordination system is provided, that enables a user is to select the user's desired information storage system.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

What is claimed is:

1. A device communicably connected to one or more storage servers via a network, the device comprising:
   circuitry configured to,
      acquire storage setting information including a setting relating to at least one storage server among the one or more storage servers, the at least one storage server to be used by a user identified through a user authentication process, the acquisition of the storage setting information including configuring the setting relating to the at least one storage server in response to determining the setting relating to the at least one storage server is not included in the storage setting information,
      acquire application operation information including a setting relating to operation of an application that operates on the device, the application operation information being associated with identification information of the user, and
      communicate with one storage server that is set by the application operation information based on the setting relating to the at least one storage server included in the storage setting information, the communication including at least one of sending a file to the one storage server for storage thereon or receiving the file from the one storage server.

2. The device of claim 1, wherein
   the configuring the setting relating to the at least one storage server includes,
      acquiring a list of the one or more storage servers,
      controlling a display to display the list,
      accepting an instruction to select one of the storage servers in the list,
      acquiring authentication information including an address of the selected storage server from an authentication apparatus,
      communicating with the selected storage server using the address acquired from the authentication apparatus, and
      sending the authentication information to the selected storage server, the sending the authentication information causing the authentication apparatus to set the authentication information as the setting relating to the at least one storage server in the storage setting information.

3. The device of claim 2, wherein the acquisition of the application operation information includes,
determining whether the application operation information includes the setting of the selected storage server in response to determining the setting relating to the at least one storage server is included in the storage setting information to generate a second determination result,
determining the selected storage server to be the one storage server based on the second determination result indicating that the setting of the selected storage server is included in the application operation information, and
determining the selected storage server to be a single storage server among the at least one storage server based on the second determination result indicating that the setting of the selected storage server is not included in the application operation information and only the single storage server is set in the storage setting information.

4. The device of claim 1, wherein
the application operation information includes a setting of folder information that configured to designate a folder of the one storage server,
the circuitry is configured to
acquire information relating to the folder designated by the folder information that is set in the application operation information, and
control a display to display the information relating to the folder.

5. The device of claim 4, wherein the acquisition of information relating to the folder includes acquiring information relating to a root folder of the one storage server when no folder is designated in the setting of the folder information.

6. The device of claim 5, wherein the circuitry is configured to send the identification information of the user and updated folder information to an operation information storage apparatus for storing the application operation information in response to accepting an instruction for setting the updated folder information, the sent identification information of the user and the updated folder information causing the operation information storage apparatus to set the updated folder information in the application operation information.

7. The device of claim 6, wherein the circuitry is configured to generate a new folder in the one storage server in response to accepting an operation for creating a new folder in the one storage server.

8. The device of claim 1, wherein the setting relating to the at least one storage server includes at least one link associated with authentication information.

9. The device of claim 1, wherein the acquisition of the storage setting information includes:
receiving login information from an external source;
sending the login information to an authentication apparatus; and
receiving the storage setting information from the authentication apparatus based on successful authentication of the login information.

10. The device of claim 9, wherein the storage setting information is associated with the login information.

11. The device of claim 9, wherein the setting relating to the at least one storage server authorizes access to the at least one storage server.

12. The device of claim 1, wherein the acquisition of the application operation information includes:
receiving login information from an external source;
sending the login information to an operation information storage apparatus; and
receiving the application operation information from the operation information storage apparatus based on the login information.

13. The device of claim 12, wherein the application operation information is associated with the login information.

14. The device of claim 12, wherein the setting relating to operation of the application identifies the one storage server among the at least one storage server.

15. The device of claim 12, wherein
the receiving receives the login information and a selection of the application from among a plurality of applications;
the sending sends the login information and information identifying the application to the operation information storage apparatus; and
the receiving receives the application operation information from the operation information storage apparatus based on both the login information and the information identifying the application.

16. The device of claim 15, wherein the application operation information is associated with both the login information and the information identifying the application.

17. The device of claim 1, wherein
the acquisition of the storage setting information acquires the storage setting information from an authentication apparatus; and
the acquisition of the application operation information acquires the application operation information from an operation information storage apparatus different from the authentication apparatus.

18. The device of claim 17, wherein
the setting relating to the at least one storage server authorizes access to the at least one storage server; and
the setting relating to operation of the application identifies the one storage server among the at least one storage server.

19. A method for controlling a link between one or more storage servers and a device on which an application operates, the method being performed by the device in accordance the application, comprising:
acquiring storage setting information including a setting relating to at least one storage server to be used by a user identified through a user authentication process, the acquiring the storage setting information including configuring the setting relating to the at least one storage server in response to determining the setting relating to the at least one storage server is not included in the storage setting information;
acquiring application operation information including a setting relating to operation of the application, the application operation information being associated with identification information of the user; and
communicating with one storage server that is set by the application operation information based on the setting relating to the at least one storage server included in the storage setting information, the communicating including at least one of sending a file to the one storage server for storage thereon or receiving the file from the one storage server.

20. A device coordination system comprising a device on which an application operates and an information processing apparatus that provides a device coordination service for controlling a link between the device and one or more storage servers, the system comprising:

circuitry configured to:
store storage setting information including a setting relating to at least one storage server to be used by a user identified through a user authentication process, the storage of the storage setting information including configuring the setting relating to the at least one storage server in response to determining the setting relating to the at least one storage server is not included in the storage setting information,
store application operation information including a setting relating to operation of the application, the application operation information being associated with identification information of the user, and
control a link between the device and at least one storage server that is set by the application operation information based on the setting relating to the at least one storage server included in the storage setting information, the link being configured for use by the device for at least one of sending a file to the one storage server for storage thereon or receiving the file from the one storage server.

* * * * *